United States Patent
Isobe et al.

(10) Patent No.: US 10,894,464 B2
(45) Date of Patent: Jan. 19, 2021

(54) LOW-PROFILE AIR-CONDITIONING REGISTER

(71) Applicant: TOYODA GOSEI CO., LTD., Kiyosu (JP)

(72) Inventors: Hiroyuki Isobe, Kiyosu (JP); Nobuhiro Terai, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 286 days.

(21) Appl. No.: 16/045,825

(22) Filed: Jul. 26, 2018

(65) Prior Publication Data

US 2019/0061476 A1 Feb. 28, 2019

(30) Foreign Application Priority Data

Aug. 25, 2017 (JP) ................. 2017-162406

(51) Int. Cl.
*B60H 1/34* (2006.01)
*F24F 13/075* (2006.01)

(52) U.S. Cl.
CPC ......... *B60H 1/3421* (2013.01); *F24F 13/075* (2013.01); *B60H 2001/3464* (2013.01)

(58) Field of Classification Search
CPC .......... B60H 1/3421; B60H 2001/3464; B60H 1/3428; F24F 13/075
USPC ....................................................... 454/155
See application file for complete search history.

(56) References Cited

U.S. PATENT DOCUMENTS

| 2008/0014855 A1 | 1/2008 | Leserre |
| 2014/0302769 A1 | 10/2014 | Sawada |
| 2014/0308889 A1 | 10/2014 | Oe et al. |
| 2015/0174989 A1 | 6/2015 | Oe et al. |
| 2016/0152116 A1 | 6/2016 | Albin et al. |
| 2016/0288624 A1 | 10/2016 | Albin et al. |

(Continued)

FOREIGN PATENT DOCUMENTS

| DE | 102013209430 B3 | 9/2014 |
| DE | 202013012285 U1 | 2/2016 |
| DE | 102014218840 A1 | 4/2016 |

(Continued)

OTHER PUBLICATIONS

Office Action dated Jul. 1, 2020 issued in corresponding JP Patent application No. 2017-162406 (and English translation).

*Primary Examiner* — Grant Moubry
*Assistant Examiner* — Ryan L Faulkner
(74) *Attorney, Agent, or Firm* — Posz Law Group, PLC

(57) ABSTRACT

A low-profile air-conditioning register includes a retainer, which has an air passage, a fin, an operation knob assembly, and a transmission mechanism. The air passage has an outlet port having a pair of short side portions and a pair of long side portions. The retainer includes a pair of inclined surfaces at a downstream end of the retainer. The fin is arranged upstream of the inclined surfaces and is swingably supported by the retainer with a fin pivot, which extends in an extension direction of the long side portions. The operation knob assembly is provided at a downstream section of the retainer. The transmission mechanism is configured to transmit a motion of the operation knob assembly to the fin such that the fin is swung in a direction of as opposite trend to an operated direction of the operation knob assembly.

5 Claims, 8 Drawing Sheets

(56) References Cited

U.S. PATENT DOCUMENTS

2017/0259649 A1* 9/2017 Shibata ................ B60H 1/3421

FOREIGN PATENT DOCUMENTS

| | | | |
|---|---|---|---|
| JP | 2014-031046 A | 2/2014 | |
| JP | 2014-031047 A | 2/2014 | |
| JP | 2014-031055 A | 2/2014 | |
| JP | 2014-091376 A | 5/2014 | |
| JP | 2014-151862 A | 8/2014 | |
| JP | 2014-196105 A | 10/2014 | |
| JP | 2014-210502 A | 11/2014 | |
| JP | 2017100494 | * 11/2015 | ............... B60H 1/34 |
| JP | 2016-013758 A | 1/2016 | |
| JP | 2017-087760 A | 5/2017 | |
| WO | 2013/069316 A1 | 5/2013 | |

* cited by examiner

LOW-PROFILE AIR-CONDITIONING REGISTER

BACKGROUND

The present invention relates to a low-profile air-conditioning register that has a rectangular outlet port and is configured to use fins to change the direction of air-conditioning air that is delivered from an air conditioner and blown out through the outlet port.

Vehicles have air-conditioning registers that are installed in the instrument panel and change the direction of air-conditioning air delivered from the air conditioner and blown into the passenger compartment through outlet ports. Conventionally, the forms of the air-conditioning register include types in which the dimension of the outlet port is greatly different between the vertical direction and the lateral direction. Specifically, various types of low-profile air-conditioning registers have been developed. A low-profile air-conditioning register has an outlet port of which the dimension is greatly different between the vertical direction and the lateral direction.

For example, Japanese Laid-Open Patent Publications No. 2016-13758 and No. 2014-91376 each disclose a low-profile air-conditioning register that has a retainer, fins, and an operation knob assembly. The retainer has an air passage for air-conditioning air. The air passage has an outlet port at the downstream end in the flow direction of air-conditioning air. The outlet port has a rectangular shape composed of a pair of opposed short side portions and a pair of opposed long side portions, which intersect, with the short side portions. The retainer has a pair of inclined surfaces at the downstream end in the flow direction. The inclined surfaces face each other and are connected to the long side portions such that the distance between the inclined surfaces decreases toward the downstream side. The fins each have a plate-like shape extending along the long side portions and are arranged upstream in the flow direction of the inclined surfaces. The fins are swingably supported by the retainer with fin pivots extending in the extension direction of the long side portions. The operation knob assembly is located at the downstream section in the flow direction of the retainer.

In the low-profile air-conditioning register having the above-described configuration, when the operation knob assembly is operated and the fins are inclined with respect to the inner wall surfaces of the retainer, the air-conditioning air delivered from the air conditioner flows along the fins, so that it strikes the inner wall surfaces and changes the flow direction. The air-conditioning air flows along one of the inclined surfaces to be blown out obliquely from the outlet port.

However, in the low-profile air-conditioning registers disclosed in Japanese Laid-Open Patent Publications No. 2016-13758 and No. 2014-91376, when the operation knob assembly is operated to swing the fins, the air-conditioning air may be blown out from the outlet port in a direction of the opposite trend to the direction in which the operation knob assembly is operated. For example, if the operation knob assembly is designed to be operated in the vertical direction, an upward operation of the operation knob assembly may cause the air-conditioning air to be blown obliquely downward from the outlet port. In contrast, a downward operation of the operation knob assembly may cause the air-conditioning air to be blown obliquely upward from the outlet port. In this manner, when the air-conditioning air is blown out in a direction of the opposite trend to the operated direction of the operation knob assembly, the occupant who has operated the operation knob assembly experiences a feeling of strangeness, which degrades the usability.

SUMMARY

Accordingly, it is an objective of the present invention to provide a low-profile air-conditioning register that improves the usability by causing air-conditioning air to be blown out in the direction of the same trend as the operated direction of the operation knob assembly.

To achieve the foregoing objective, a low-profile air-conditioning register is provided that includes a retainer, a plate-shaped fin, an operation knob assembly, and a transmission mechanism. The retainer has an air passage. The air passage has an outlet port at a downstream end in a flow direction of air-conditioning air. The outlet port has a rectangular shape composed of a pair of opposed short side portions and a pair of opposed long side portions, which intersect with the short side portions. The retainer includes a pair of inclined surfaces at a downstream end in the flow direction of the retainer. The inclined surfaces face each other and are connected to the long side portions such that a distance between the inclined surfaces decreases toward a downstream side. The plate-shaped fin is arranged upstream in the flow direction of the inclined surfaces and extends along the long side portions. The fin is swingably supported by the retainer with a fin pivot, which extends in an extension direction of the long side portions. The low-profile air-conditioning register is configured such that after flowing along the fin and striking an inner wall surface of the retainer so that the flow direction is changed, the air-conditioning air flows along one of the inclined surfaces to be blown out obliquely from the outlet port. The operation knob assembly is provided at a downstream section in the flow direction of the retainer to be operable in an extension direction of the short side portions. The transmission mechanism is provided between the operation knob assembly and the fin. The transmission mechanism is configured to transmit a motion of the operation knob assembly to the fin such that the fin is swung in a direction of an opposite trend to an operated direction of the operation knob assembly.

DETAILED DESCRIPTION OF THE PREFERRED EMBODIMENTS

A low-profile air-conditioning register for a vehicle according to one embodiment, will now be described with reference to the drawings.

In the following description, the direction in which the vehicle advances (moves forward) will be referred to as the front, and the reverse direction will be referred to as the rear. The height direction of the vehicle will be referred to as the vertical direction. The width direction (the lateral direction) of the vehicle is defined with reference to the state in which the vehicle is viewed from the rear.

In the passenger compartment, the instrument panel is located in front of the front seats of the vehicle (the driver's seat and the front passenger seat). The instrument panel incorporates low-profile air-conditioning registers at the center and the sides with reference to the lateral direction. As in the case of a general non-low-profile air-conditioning register, the main function of the low-profile air-conditioning register is to change the direction of the air-conditioning air delivered from the air conditioner and blown into the passenger compartment.

Figure 1:
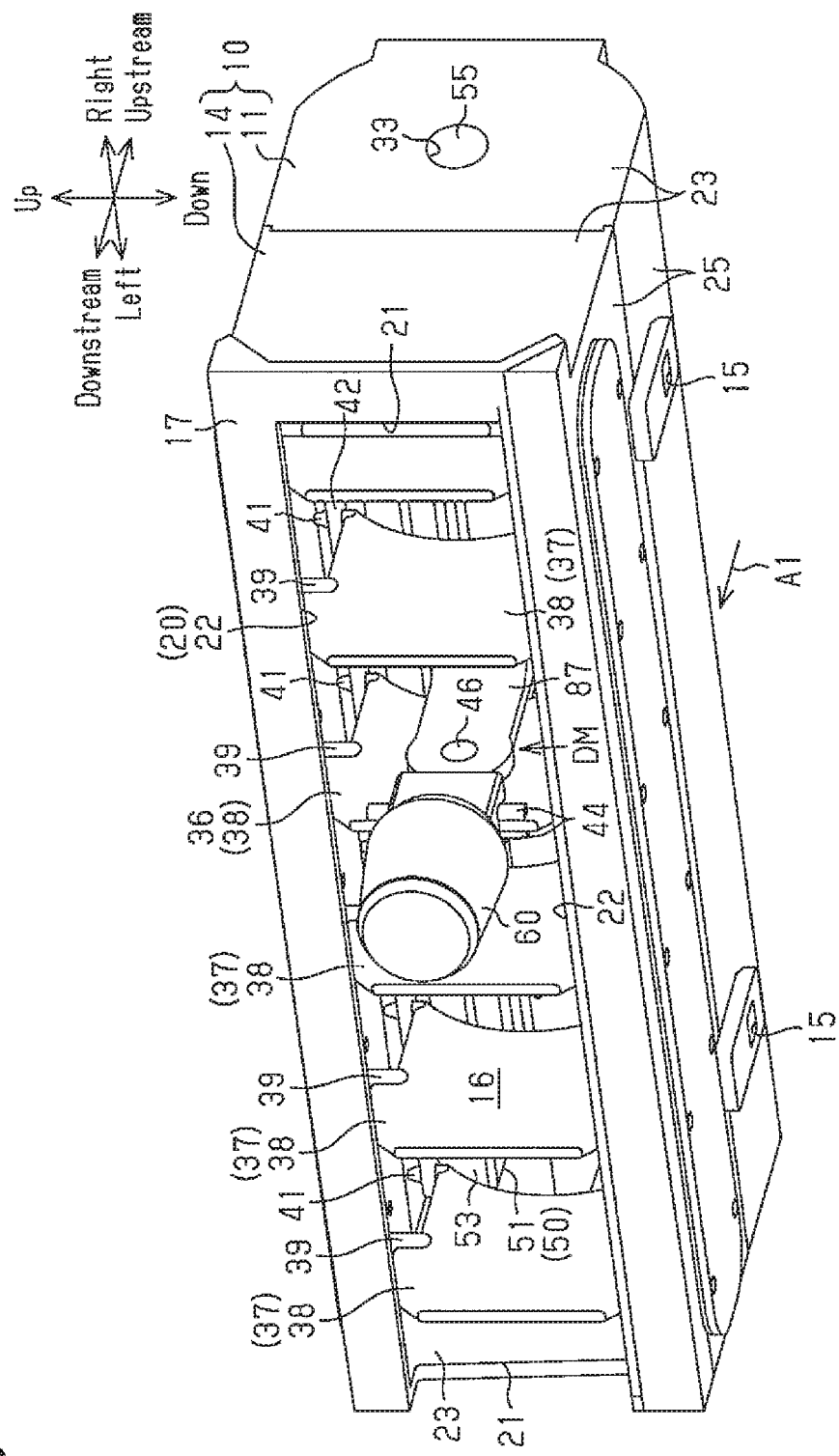
FIG. 1 is a perspective view showing a low-profile air-conditioning register according to one embodiment.
Figure 2:
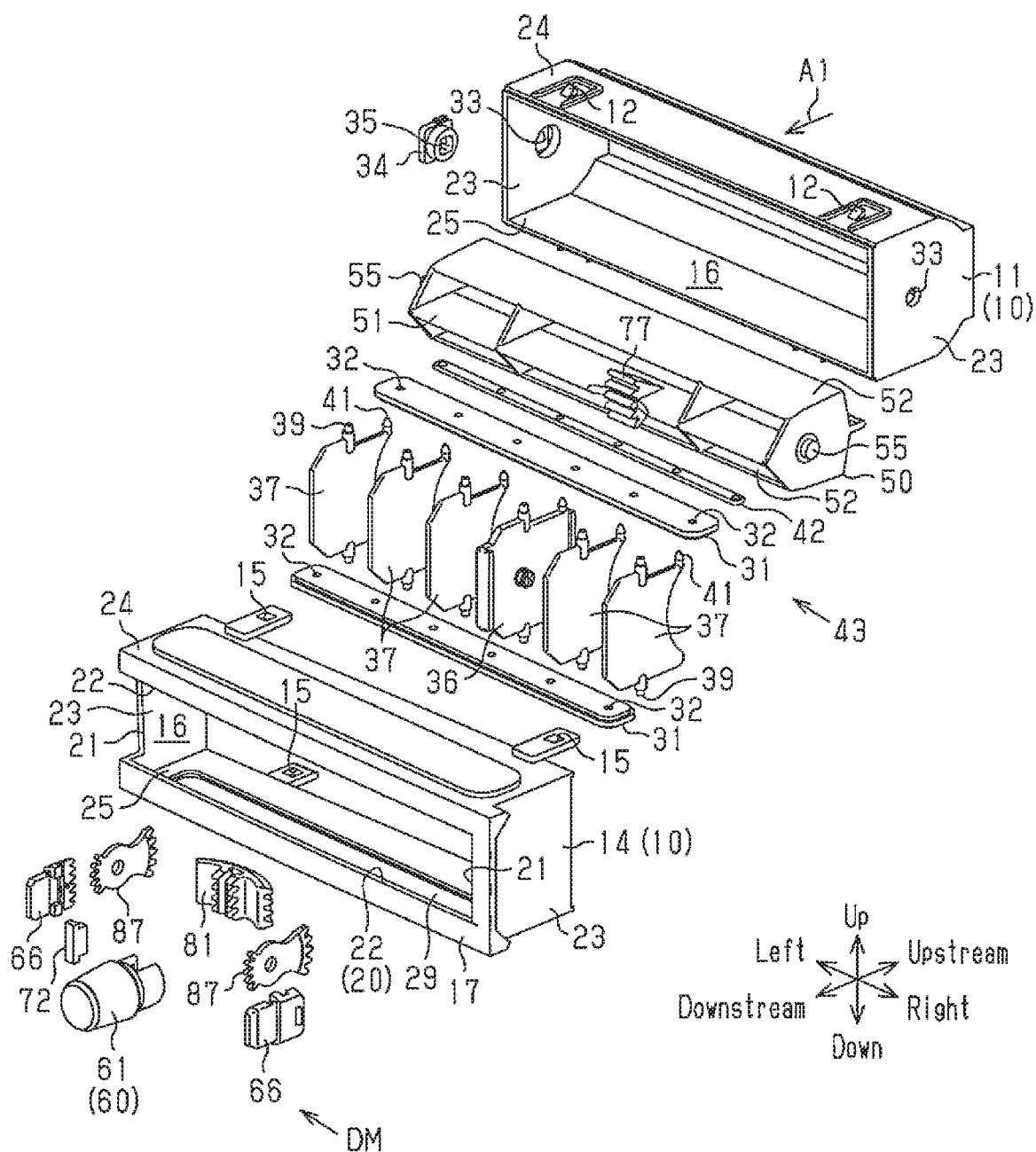
FIG. 2 is an exploded perspective view showing main components of the low-profile air-conditioning register of FIG. 1.

As shown in FIGS. 1 and 2, the low-profile air-conditioning register includes a retainer 10, downstream fins, a barrel fin 50, an operation knob assembly 60, and a transmission mechanism DM. The structure of each component constituting the low-profile air-conditioning register will now be described.

<Retainer 10>

The retainer 10 is configured to connect the duct (not shown) of the air conditioner to the opening (not shown) in the instrument panel. The interior space of the retainer 10 constitutes a passage for the air-conditioning air A1 (hereinafter, referred to as an air passage 16).

With regard to the direction in which the air-conditioning air A1 flows, the side closer to the air conditioner will be referred to as the "upstream side," and the side farther from the air conditioner will be referred to as the "downstream side."

Figure 5:
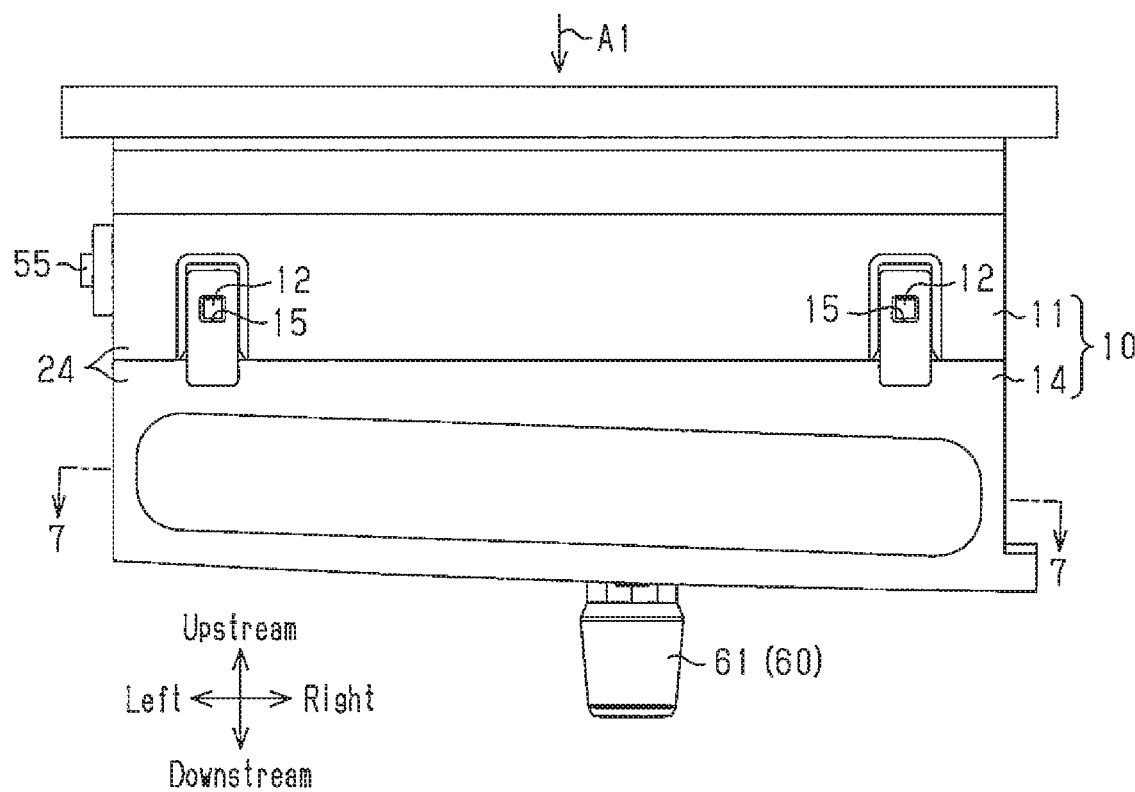
FIG. 5 is a plan view showing the low-profile air-conditioning register of FIG. 1.

The retainer 10 includes an upstream retainer member 11 and a downstream retainer member 14, which is arranged adjacent to and downstream of the upstream retainer member 11. The upstream retainer member 11 and the downstream retainer member 14 are both substantially shaped like a rectangular tube with open upstream and downstream ends. The lateral dimension of each of the retainer members 11, 14 is greater than the vertical dimension. The downstream retainer member 14 has securing holes 15 at the upper and lower upstream ends. The upstream retainer member 11 has securing protrusions 12 at positions corresponding to the securing holes 15 of the downstream retainer member 14 (see FIG. 5). That is, the downstream retainer member 14 is coupled to the upstream retainer member 11 by securing the securing protrusions 12 to the securing holes 15.

The downstream retainer member 14 has a bezel 17 provided at the outer periphery at the most downstream section. The bezel 17 constitutes the design surface of the low-profile air-conditioning register and has a horizontally elongated rectangular opening. This opening is located at the downstream end of the air passage 16 and constitutes an outlet port 20 of the air-conditioning air A1. The outlet port 20 includes a pair of short side portions 21 and a pair of long side portions 22, which are longer than the short side portions 21. The short side portions 21 are parallel with and spaced apart from each other and extend in the vertical direction. The long side portions 22 are parallel with and spaced apart from each other, extend in the lateral direction, and are orthogonal to the short side portions 21. That is, the vertical direction corresponds to the extension direction of the short side portions 21, and the lateral direction corresponds to the extension direction of the long side portions 22.

The air passage 16 is surrounded by four walls of the retainer 10. These four walls include two side walls 23, which face each other in the lateral direction, and an upper wall 24 and a bottom wall 25, which face each other in the vertical direction. The side walls 23 face each other in the lateral direction while being parallel or substantially parallel with each other. The upper wall 24 and the bottom wall 25 face each other in the vertical direction while being parallel or substantially parallel with each other.

Figure 7:
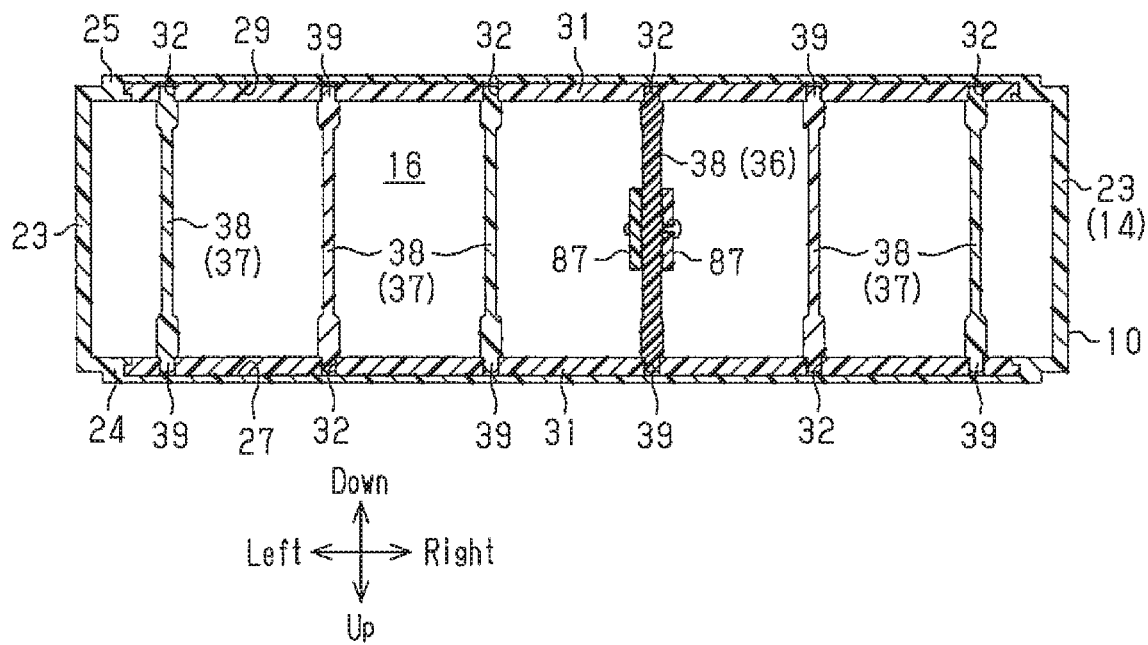
FIG. 7 is a cross-sectional view taken along line 7-7 in FIG. 5.
Figure 9A:
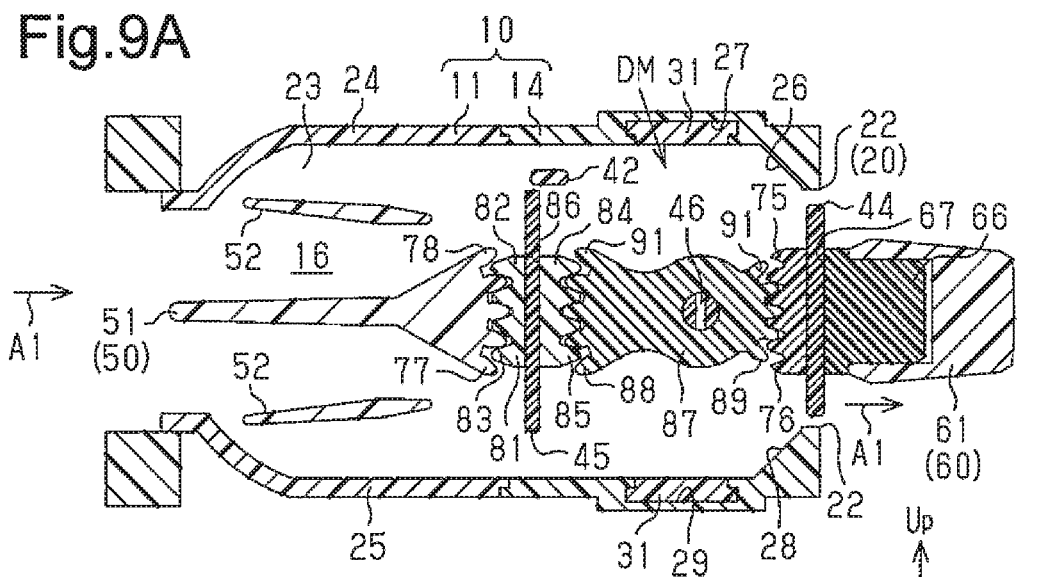
FIG. 9A is a cross-sectional view taken along line 9A-9A in FIG. 4.

As shown in FIGS. 7 and 9A, the downstream retainer member 14 has an inclined surface 26 at the downstream end of the upper wall 24. The inclined surface 26 is flat and inclined by a constant angle such that it declines toward the downstream side. The inclined surface 26 is connected to the upper long side portion 22 of the outlet port 20. The downstream retainer member 14 has an inclined surface 28 at the downstream end of the bottom wall 25. The inclined surface 28 is flat and inclined by a constant angle such that it rises toward the downstream side. The inclined surface 28 is connected to the lower long side portion 22 of the outlet port 20. Since the upper inclined surface 26 and the lower inclined surface 28 are inclined as described above, the distance between the inclined surfaces 26, 28 decreases toward the downstream side at the downstream end of the retainer 10.

The upper wall 24 has an upper recess 27 arranged upstream of and in the vicinity of the inclined surface 26. The upper recess 27 opens in the lower surface of the upper wall 24. The bottom wall 25 has a lower recess 29 arranged upstream of and in the vicinity of the inclined surface 28. The lower recess 29 opens in the upper surface of the bottom wall 25. The upper and lower recesses 27, 29 are each elongated in the lateral direction (see FIG. 2).

A downstream shim 31 made of a soft plastic material is fitted in each of the upper recess 27 and the lower recess 29. The shims 31 are restricted from coming off. Each downstream shim 31 has pivot receiving holes 32 at several positions spaced apart in the lateral direction (see FIG. 2). The pivot receiving holes 32 extend through the downstream shim 31.

Figure 6:
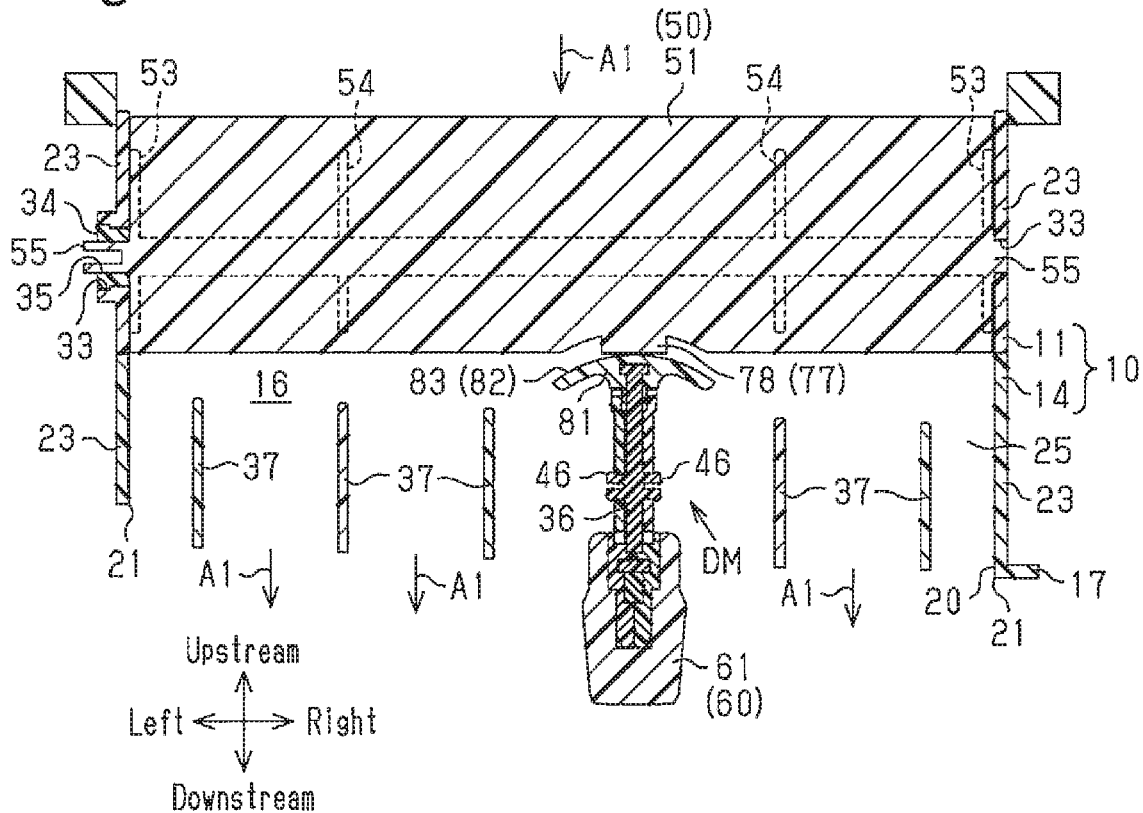
FIG. 6 is a cross-sectional view taken along line 6-6 in FIG. 4.

As shown in FIGS. 2 and 6, the left and right side walls 23 of the upstream retainer member 11 each have a hole 33 extending in the lateral direction through the side wall 23. The holes 33 are located upstream of the upper and lower recesses 27, 29. At least one of the holes 33 receives an upstream shim 34 made of a soft plastic material. In the present embodiment, only the left hole 33 receives the upstream shim 34. The upstream shim 34 has a pivot receiving hole 35, which extends therethrough in the lateral direction.

<Downstream Fins>

As shown in FIGS. 2 and 7, the downstream fins are arranged in the downstream retainer member 14 so as to be spaced apart from each other in the lateral direction. The downstream fins are located upstream of and in the vicinity of the outlet port 20 of the air passage 16. Also, the arrangement direction of the downstream fins (lateral direction) intersects with the flow direction of the air-conditioning air A1.

To distinguish the multiple downstream fins, the one located at the center in the lateral direction will be referred to as a downstream fin 36, and the other downstream fins will be referred to as downstream fins 37.

Figure 3:
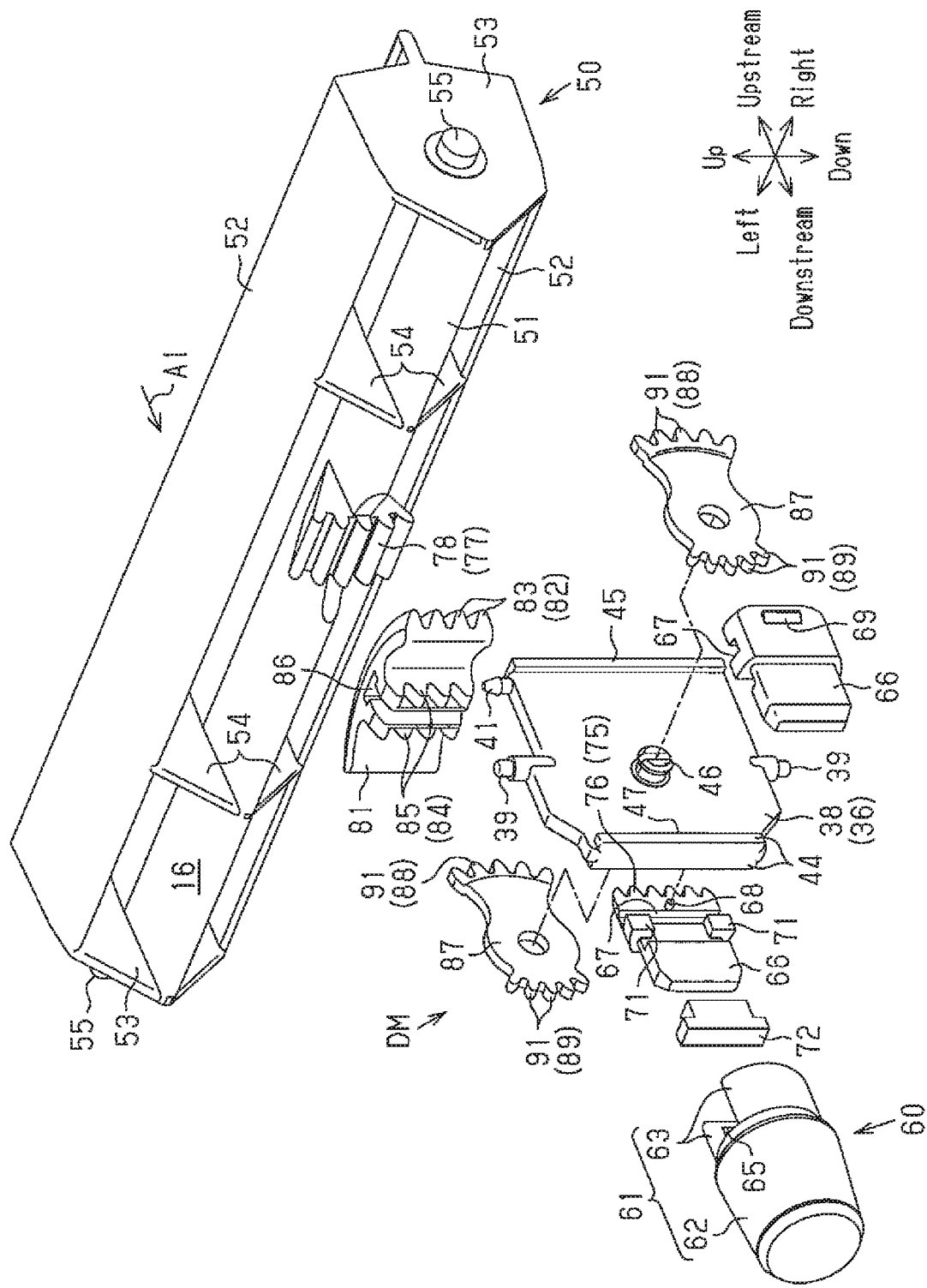
FIG. 3 is an exploded perspective view showing some components of the low-profile air-conditioning register of FIG. 1.
Figure 4:
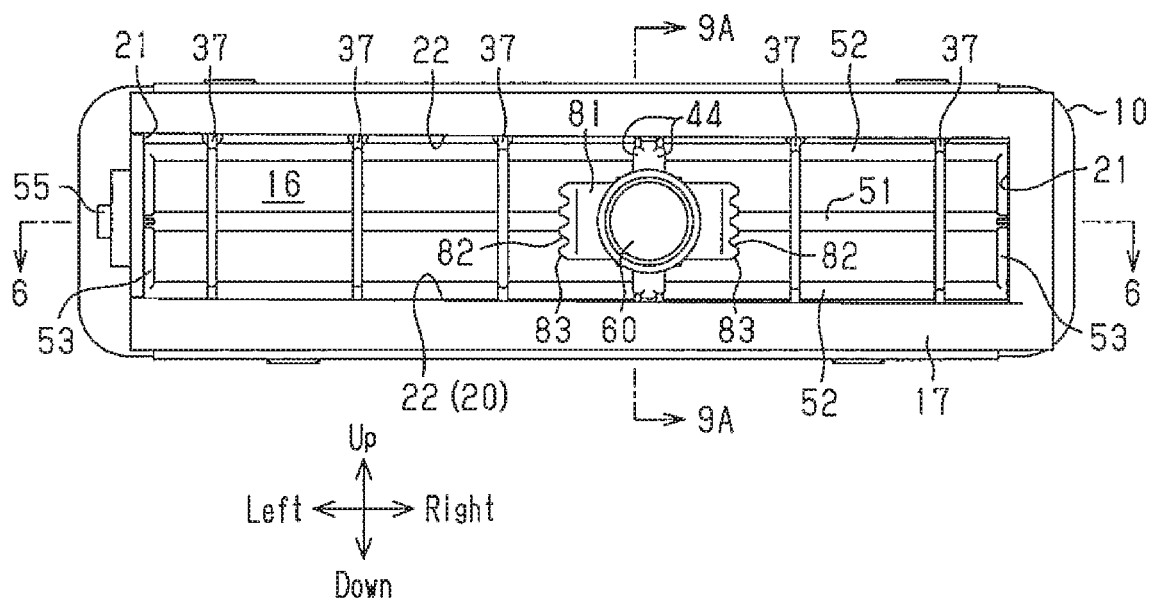
FIG. 4 is a front view showing the low-profile air-conditioning register of FIG. 1.

As shown in FIGS. 3 and 7, the downstream fins 36, 37 have a common structure constituted by plate-shaped downstream fin main body 38, a pair of downstream fin pivots 39, and a downstream coupling pin 41. Each downstream fin main body 38 has a plate-like shape extending in the flow direction of the air-conditioning air A1 and in the vertical direction. The two downstream fin pivots 39 of each of the downstream fins 36, 37 are provided at the upper and lower ends of the downstream fin main body 38. The two downstream fin pivots 39 extend in the vertical direction and are engaged with the pivot receiving holes 32 of the downstream shims 31. The engagement allows the downstream fins 36, 37 to be supported by the upper wall 24 and the bottom wall 25 with the downstream shims 31 via the upper and lower downstream fin pivots 39, so that the downstream fins 36, 37 are swingable in the lateral direction about the downstream fin pivots 39.

As shown in FIGS. 2 and 3, the downstream coupling pin 41 extends upward at the upper end of each downstream fin main body 38. In each downstream fin main body 38, the downstream coupling pin 41 is located at a position displaced upstream from the upper downstream fin pivot 39. The coupling pins 41 of the respective downstream fins 36, 37 are coupled together by a coupling rod 42, which extends substantially in the lateral direction (see FIG. 9A). The coupling pins 41 of the respective downstream fins 36, 37 and the coupling rod 42 constitute a link mechanism 43, which mechanically couples the downstream fins 36, 37 together to allow the downstream fins 37 to swing in synchronized with the downstream fin 36 so as to have an inclination of the same trend as that of the downstream fin 36.

Figure 8:
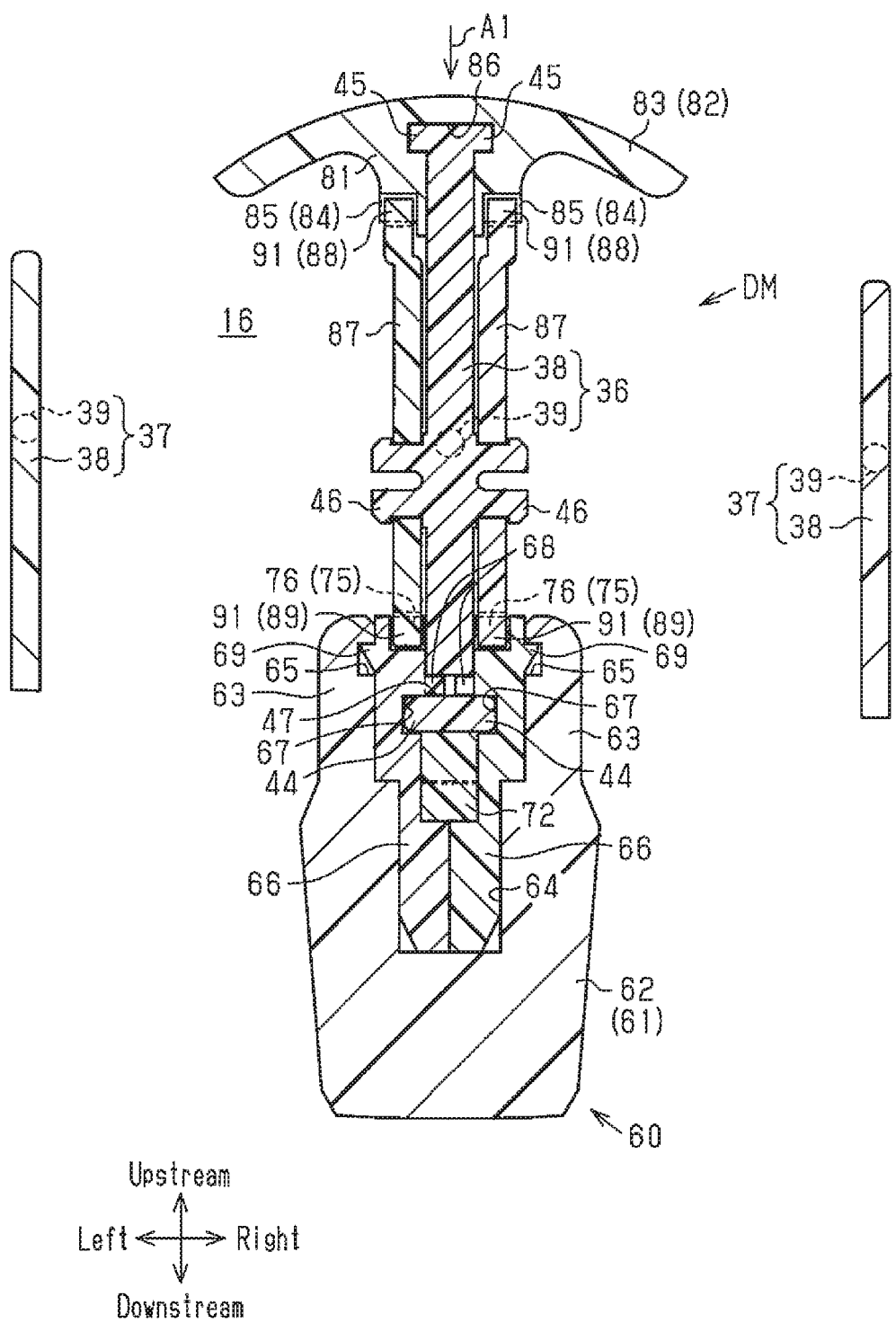
FIG. 8 is an enlarged cross-sectional plan view showing a part of FIG. 6.

As shown in FIGS. 3 and 8, the downstream fin 36 has a structure different from that of the downstream fins 37 and includes a pair of downstream rail portions 44, a pair of upstream rail portions 45, a pair of intermediate shafts 46, and a guide hole 47. The downstream rail portions 44 extend in the vertical direction on the left and right sides of the downstream end of the downstream fin main body 38. The upstream rail portions 45 extend in the vertical direction on the left and right sides of the upstream end of the downstream fin main body 38. The intermediate shafts 46 protrude from the downstream fin main body 38 to the left and right sides at positions between the downstream rail portions 44 and the upstream rail portions 45. The intermediate shafts 46 are located in the middle between the downstream fin pivots 39 in the vertical direction. The guide hole 47 is constituted by a long hole extending in the vertical direction at a position upstream of and in the vicinity of the downstream rail portions 44 of the downstream fin main body 38.

<Barrel Fin 50>

As shown in FIGS. 3 and 9A, the barrel fin 50 is located in the upstream retainer member 11 and is located upstream of and in the vicinity of the downstream fins 36, 37. The barrel fin 50 has multiple plate-shaped upstream fins spaced apart from each other in the vertical direction. The upstream fins extend in the lateral direction. In the present embodiment, three upstream fins are provided. The arrangement direction of the upstream fins (the vertical direction) intersects with the flow direction and the arrangement direction of the downstream fins 36 and 37 (the lateral direction).

To distinguish the multiple upstream fins, the one located a the center in the vertical direction will be referred to as an upstream fin 51, and the other upstream fins will be referred to as upstream fins 52. The left ends of the upstream fins 51, 52 are coupled together by a left side plate portion 53, which extends in the flow direction and the vertical direction. Likewise, the right ends of the upstream fins 51, 52 are coupled together by a right side plate portion 53, which extends in the flow direction and the vertical direction. That is, the upstream fins 51, 52 each have first and second ends (left and right ends) in the lateral direction, which is the extension direction of the long side portions 22 of the outlet port 20. The first ends and the second ends of the upstream fins 51, 52 are respectively coupled together by the corresponding side plate portion 53, which extends in the vertical direction, or the extension direction of the short side portions 21 of the outlet port 20.

The vertically adjacent upstream fins 51, 52 are coupled together by two coupling plate portions 54 extending in the flow direction and the vertical direction (see FIG. 6). The coupling plate portions 54 are provided between the side plate portions 53 at positions spaced apart from each other in the lateral direction. The coupling plate portions 54 increase the stiffness of the barrel fin 50 and limit vertical warping of the laterally elongated upstream fins 51, 52.

As shown in FIGS. 3 and 6, each side plate portion 53 has an upstream fin pivot 55 protruding away from the other side plate portion 53 on the opposite side. The left upstream fin pivot 55 is engaged with the pivot receiving hole 35 of the upstream shim 34. The right upstream fin pivot 55 is engaged with the hole 33 in the right side wall 23 of the upstream retainer member 11. The engagement, allows the barrel fin 50 to be supported by the side wall portions 23 of the retainer 10 at the left and right upstream fin pivots 55 to be swingable in the vertical direction about the upstream fin pivots 55.

<Operation Knob Assembly 60>

As shown in FIG. 6, the operation knob assembly 60 is a member operated by the occupant to change the blowing direction of the air-conditioning air A1 from the outlet port 20. The operation knob assembly 60 is installed at the outlet port 20 so as to be operable in the vertical direction with respect to the downstream fins 36. As shown in FIGS. 3 and 8, the operation knob assembly 60 includes a knob main body 61 and a pair of transmission portions 66 mounted to the knob main body 61.

The knob main body 61 includes a truncated cone-shaped knob 62 and a pair of arms 63 protruding upstream from the knob 62. The arms 63 are spaced apart from each other in the lateral direction. The knob 62 has an accommodating recess 64, which opens at the upstream end face and is recessed toward the downstream side. The accommodating recess 64 communicates with the space between the arms 63. Each arm 63 has a securing recess 65 at the upstream end of the surface opposed to the other arm 63.

The two transmission portions 66 are arranged adjacent to each other in the lateral direction. The downstream sections of the two transmission portions 66 are accommodated in the accommodating recess 64 in a state of being stacked onto each other in the lateral direction. The upstream sections of the transmission portions 66 are sandwiched by the arms 63 from both left and right sides. Each transmission portion 66 has a groove 67, which opens in the surface opposed to the other transmission portion 66 and extends in the vertical direction. Each transmission portion 66 is engaged with the corresponding downstream rail portion 44 at the groove 67 to be slidable in the vertical direction.

Each transmission portion 66 has a pin 68 on the surface opposed to the other transmission portion 66. In each transmission portion 66, the pin 68 is located upstream of and in the vicinity of the groove 67 and extends toward the other transmission portion 66. As described above, in a state in which the transmission portions 66 are engaged with the downstream rail portions 44 at the grooves 67, the pins 68 are inserted into the guide hole 47 to be movable in the vertical direction. The pins 68 and the guide hole 47 define the movable range of the operation knob assembly 60 in the vertical direction. When the pins 68 move upward in accordance with the upward operation of the operation knob assembly 60 and come into contact with the inner wall surface at the upper end of the guide hole 47, the pins 68 restrict the operation knob assembly 60 from moving further upward. In contrast, when the pins 68 move downward in accordance with the downward operation of the operation knob assembly 60 and come into contact with the inner wall surface at the lower end of the guide hole 47, the pins 68 restrict the operation knob assembly 60 from moving further downward.

Also, each transmission portion 66 has a securing protrusion 69 in an upstream section of the surface opposite from the other transmission portion 66. As described above, in a state in which each transmission portion 66 is engaged with the corresponding downstream rail portion 44 at the groove 67, the securing protrusion 69 is secured to the securing recess 65 of the corresponding arm 63. The securing protrusions 69, being secured to the securing recesses 65, restrict the transmission portions 66 from coming off the knob main body 61.

Each transmission portion 66 has a pair of restricting projections 71 on the downstream side of the groove 67. The restricting projections 71 are provided at the upper and lower sections on the surface of each transmission portion 66 that faces the other transmission portion 66. A shim 72 arranged between the left and right transmission portions 66, between the upper restricting projections 71 and the lower restricting projections 71, and downstream of the left and right grooves 67. The shim 72 is made of a soft plastic material and elastically contacts the downstream end face of the downstream fin main body 38 and the downstream rail portions 44 on the left and right sides. This contacting state generates sliding resistance between the shim 72 and each of the downstream fin main body 38 and the downstream rail portions 44 when the operation knob assembly 60 is operated in the vertical direction, which applies an adequate load to the operation.

<Transmission Mechanism DM>

As shown in FIGS. 3, 8, and 9A, the transmission mechanism DM is provided between the operation knob assembly 60 and the upstream fin 51. The main function of the transmission mechanism DM is to transmit the movement of the operation knob assembly 60 to the upstream fin 51 such that the barrel fin 50 swings in the direction of the opposite trend to the operated direction of the operation knob assembly 60 in the vertical direction. The direction of the opposite trend is the downward direction when the operated direction of the operation knob assembly 60 is the upward direction. The direction of the opposite trend is the upward direction when the operated direction is the downward direction.

The transmission mechanism DM includes a pair of drive gears 75, a driven gear 77, and intermediate gears arranged between the drive gears 75 and the driven gear 77 to transmit force.

The drive gears 75 are provided at the upstream ends of the transmission portions 66 in the operation knob assembly 60. Each drive gear 75 has multiple teeth 76 arranged at regular intervals in the vertical direction.

The driven gear 77 is provided in the downstream section of the upstream fin 51. The driven gear 77 has multiple teeth 78, which extend in the lateral direction. The teeth 78 are arranged at equal angular intervals along an arc centered on the upstream fin pivots 55.

The intermediate gears include one upstream intermediate gear 81 and a pair of downstream intermediate gears 87. The upstream intermediate gear 81 and the downstream intermediate gears 87 are both attached to the downstream fin 36.

The upstream intermediate gear 81 includes one upstream gear section 82 and a pair of downstream gear sections 84. The upstream gear section 82 is located in the upstream section of the upstream intermediate gear 81 and has teeth 83. The teeth 83 are arranged at regular intervals in the vertical direction. Each tooth 83 extends along an arc centered on the downstream fin pivots 39 of the downstream fin 36 and is curved so as to bulge upstream.

The downstream gear sections 84 are spaced apart from each other in the lateral direction and protrude downstream from the central portion in the lateral direction of the upstream gear section 82. Each downstream gear section 84 has multiple teeth 85 arranged at regular intervals in the vertical direction.

A groove 86 extending in the vertical direction is provided at the boundary between the upstream gear section 82 and the downstream gear sections 84. The upstream intermediate gear 81 is engaged with the left and right upstream rail portions 45 at the groove 86, so as to be slidable in the vertical direction.

The downstream intermediate gears 87 are arranged on the left and right sides of the downstream fin main body 38 in the downstream fin 36. Each downstream intermediate gear 87 is engaged with the corresponding intermediate shaft 46 to be pivotal about the intermediate shaft 46. Each downstream intermediate gear 87 includes an upstream gear section 88 and a downstream gear section 89, which is located downstream of the upstream gear section 88. The upstream gear section 88 and the downstream gear section 89 of each downstream intermediate gear 87 each have multiple teeth 91 arranged along an arc centered on the intermediate shaft 46. Each downstream intermediate gear 87 is meshed with the corresponding downstream gear section 84 of the upstream intermediate gear 81 in the upstream gear section 88. Also, each downstream intermediate gear 87 is meshed with the drive gear 75 of the corresponding transmission portion 66 in the downstream gear section 89.

An operation and advantages of the low-profile air-conditioning register of the present embodiment, which has the above-described configuration, will now be described.

FIGS. 1, 4 to 8, and 9A show a state of the components of the low-profile air-conditioning register when the operation knob assembly 60 is located at the center in the movable range in the vertical direction and the center in the movable range in the lateral direction. This state of the operation knob assembly 60 is referred to as a neutral state.

In the transmission mechanism DM, the pins 68 (see FIG. 3) are located at the center in the vertical direction of the guide hole 47. The groove 67 of each transmission portion 66 is engaged with the corresponding downstream rail portion 44 at the center in the vertical direction (see FIG. 9A). A large number of the teeth 76 of each drive gear 75 mesh with the teeth 91 of the downstream gear section 89. A large number of the teeth 91 of the upstream gear section 88 of each downstream intermediate gear 87 mesh with substantially all the teeth 85 in the downstream gear section 84 of the corresponding upstream intermediate gear 81. The groove 86 of the upstream intermediate gear 81 is engaged with the upstream rail portions 45 at the center in the vertical direction. The upstream gear section 82 of the upstream intermediate gear 81 meshes with a large number of the teeth 78 of the driven gear 77 at substantially all the teeth 83. The upstream gear section 82 meshes with the driven gear 77 at the center in the lateral direction (see FIG. 6).

As shown in FIGS. 6 and 9A, the upstream fins 51, 52 of the barrel fin 50 are in the positions along the flow direction of the air-conditioning air A1 before being introduced into the air passage 16. The upstream fins 51, 52 are substantially parallel with the upper wall 24 and the bottom wall 25 of the retainer 10.

In addition, the downstream fin 36 is in the position along the flow direction of the air-conditioning air A1 before being introduced into the air passage 16. The downstream fin 36 is substantially parallel with both side wall portions 23 of the retainer 10. The same applies to the other downstream fins 37 coupled to the downstream fin 36 via the coupling rod 42.

Therefore, the air-conditioning air A1, flowing into the retainer 10, sequentially passes through the barrel fin 50 and the downstream fins 36 and 37. In the barrel fin 50, most of the air-conditioning air A1 flows along the upstream fins 51, 52 through between the adjacent upstream fins 51, 52.

Some of the air-conditioning air A1 that has passed through the barrel fin 50 flows along the downstream fins 36, 37 through between the adjacent downstream fins 36, 37 and the adjacent downstream fins 37. Another part of the air-conditioning air A1 that has passed through the barrel fin 50 flows along the downstream fins 37 and the side wall portions 23 through between the downstream fins 37 at both ends in the lateral direction and the adjacent side wall portion 23 of the retainer 10.

As a result, the air-conditioning air A1 is blown out straight from the outlet port 20 to the downstream side with almost no change in the flow direction in the lateral direction or in the vertical direction.

Figure 9B:
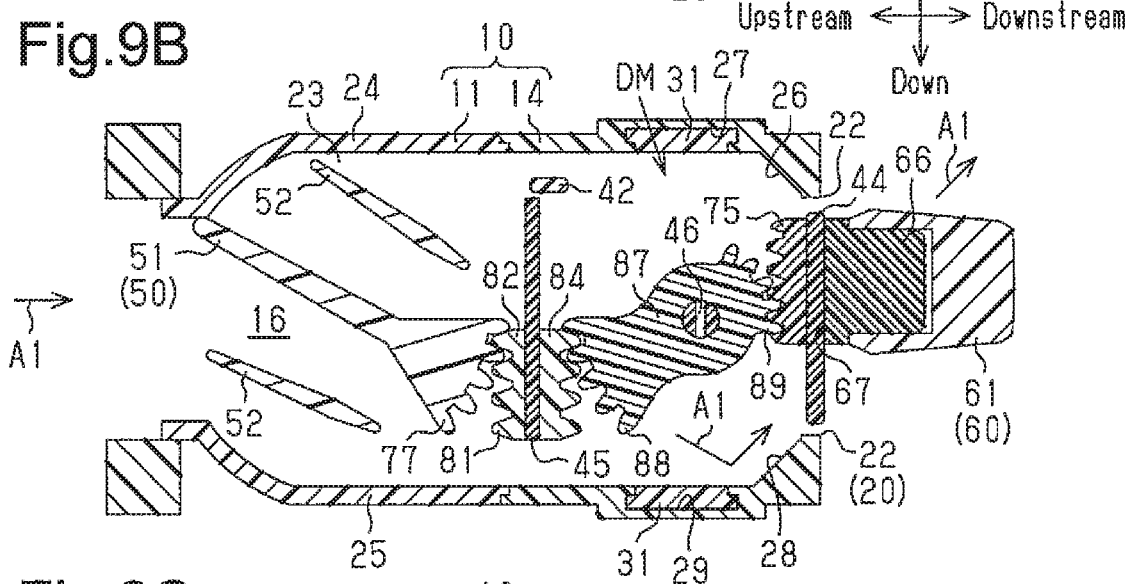
FIG. 9B is a cross-sectional side view showing the internal state of the low-profile air-conditioning register when the operation knob assembly is operated upward from the neutral state in FIG. 9A.

When an upward force is applied to the operation knob assembly 60 in the neutral state as an operation to move it upward, the force is transmitted to both transmission portions 66 as shown in FIG. 9B. The drive gears 75 of the transmission portions 66 slide upward with the knob main body 61 along the downstream rail portions 44. The meshing position between the drive gears 75 of the transmission portions 66 and the downstream gear sections 89 of the downstream intermediate gears 87 changes, and the downstream intermediate gears 87 pivot counterclockwise as viewed in FIG. 9B about the intermediate shafts 46. This pivoting action turns the upstream gear sections 88 downward about the intermediate shafts 46. The meshing position between the upstream gear sections 88 and the downstream gear sections 84 of the upstream intermediate gear 81 changes, and the upstream intermediate gear 81 slides downward along the upstream rail portions 45. The direction of this sliding action is opposite to the operated direction (upward direction) of the operation knob assembly 60. The sliding action of the upstream intermediate gear 81 changes the meshing position between the upstream gear section 82 and the driven gear 77, causing the barrel fin 50 to be swung clockwise as viewed in FIG. 9B about the upstream fin pivots 55. The direction of the swinging action (downward direction) of the barrel fin 50 is a direction of the opposite trend to the operated direction (upward) of the operation knob assembly 60 in the vertical direction. Along with the swinging action of the barrel fin 50, the inclinations of the upstream fins 51, 52 change in synchronism with each other, and the upstream fins 51, 52 are inclined such that the upstream fins 51, 52 decline toward the downstream side.

The bottom wall 25 and the lower inclined surface 28 are located on the downstream side in the direction along the upstream fin 51, 52 inclined as described above. When passing through the barrel fin 50, the air-conditioning air A1 flows along the upstream fins 51, 52 and strikes the bottom wall 25, so that the air-conditioning air A1 changes the flow direction to a direction of the opposite trend to the direction along the upstream fin 51, 52, or in a direction that rises toward the downstream side. This air-conditioning air A1 flows along the lower inclined surface 28 and is blown out obliquely upward from the outlet port 20. This blowing direction is of the same trend as the direction in which the operation knob assembly 60 is operated (upward direction) in the vertical direction, which is the extension direction of the short side portions 21 of the outlet port 20.

Figure 9C:
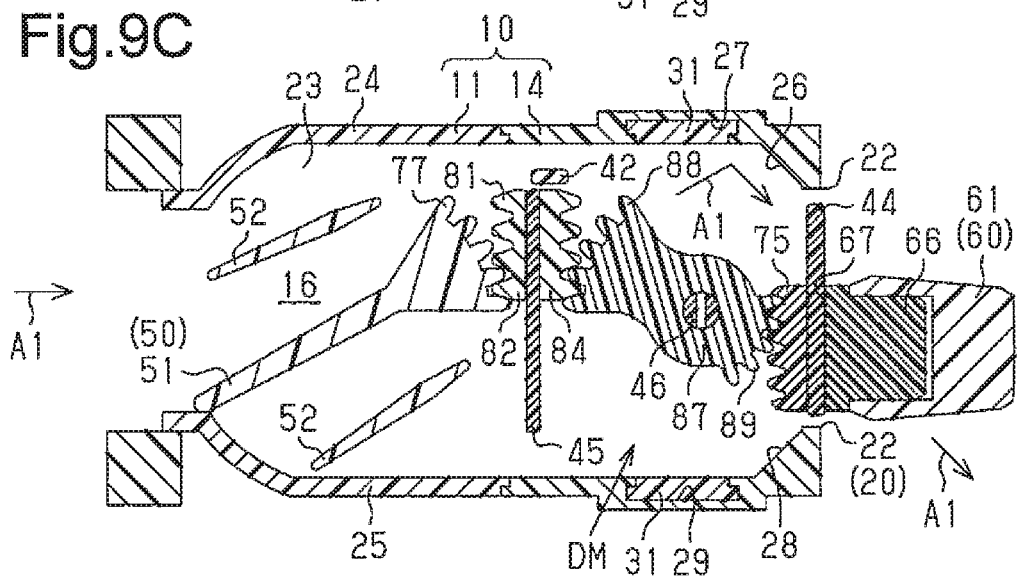
FIG. 9C is a cross-sectional side view showing the internal state of the low-profile air-conditioning register when the operation knob assembly is operated downward from the neutral state in FIG. 9A.

In contrast, the application of a downward force to the operation knob assembly 60 in the neutral state of FIG. 9A as an operation to move it downward causes the components of the low-profile air conditioning register to move in directions opposite to those in the case of the application of an upward force (see FIG. 9B) as shown in FIG. 9C.

That is, the drive gears 75 of the transmission portions 66 slide downward with the knob main body 61 along the downstream rail portions 44. The downstream intermediate gears 87 pivot clockwise as viewed in FIG. 9C about the intermediate shafts 46, and the upstream gear sections 88 turn upward about the intermediate shafts 46. The upstream intermediate gear 81 slides upward along the upstream rail portions 45, and the barrel fin 50 swings counterclockwise as viewed in FIG. 9C about the upstream fin pivots 55. Along with the swinging action of the barrel fin 50, the inclinations of the upstream fins 51, 52 change in synchronism with each other, and the upstream fins 51, 52 are inclined such that the upstream fins 51, 52 rise toward the downstream side.

When passing through the barrel fin 50, the air-conditioning air A1 flows along the upstream fins 51, 52 and strikes the upper wall 24, so that the air-conditioning air A1 changes the flow direction to a direction of the opposite trend to the direction along the upstream fin 51, 52, or in a direction that declines toward the downstream side. This air-conditioning air A1 flows along the upper inclined surface 26 and is blown out obliquely downward from the outlet port 20. The blowing direction of the air-conditioning air A1 is of the same trend as the direction in which the operation knob assembly 60 is operated (downward direction) in the vertical direction, which is the extension direction of the short side portions 21 of the outlet port 20.

In this manner, when the operation knob assembly 60 in the neutral state is operated upward, the air-conditioning air A1 is blown obliquely upward from the outlet port 20. When the operation knob assembly 60 is operated downward, the air-conditioning air A1 is blown obliquely downward from the outlet port 20. Thus, the present embodiment gives, to the occupant who has operated the operation knob assembly 60, no feeling of strangeness that would be experienced if the operated direction of the operation knob assembly 60 were different from the blowing direction of the air-conditioning air A1. Accordingly, the usability of the low-profile air-conditioning register is improved.

Figure 10:
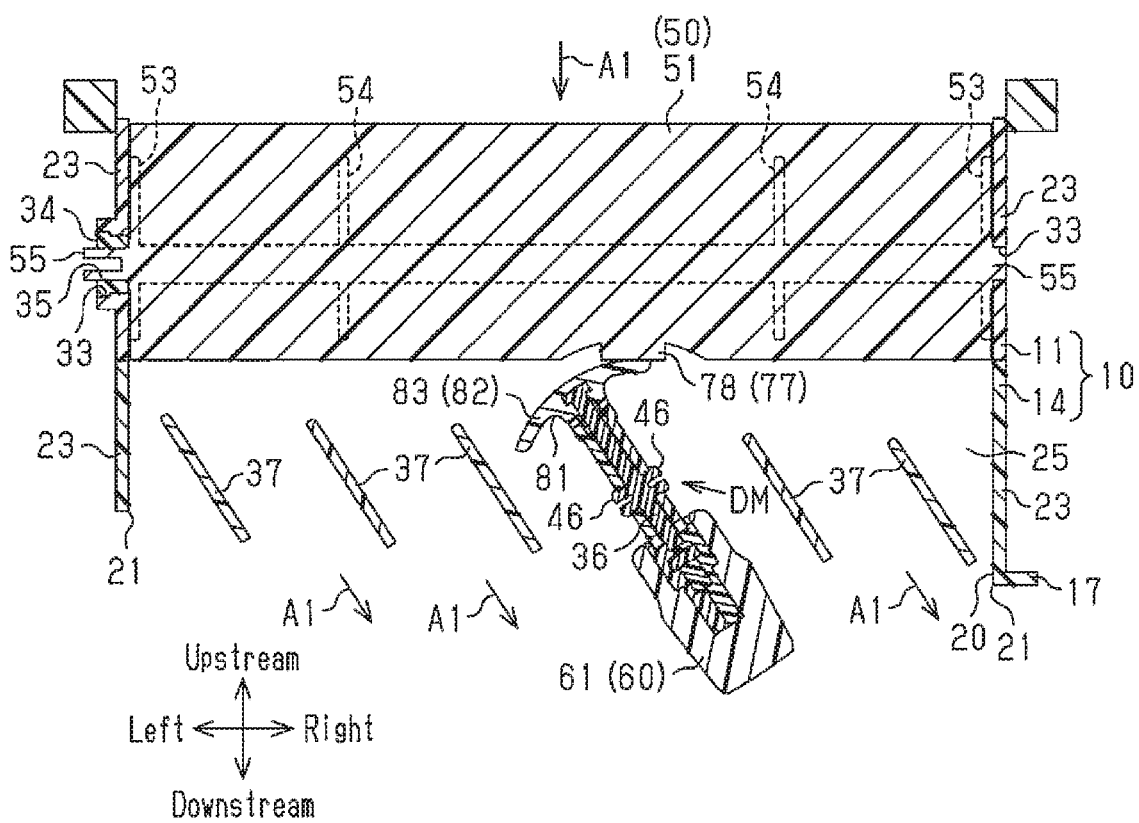
FIG. 10 is a cross-sectional plan view showing the internal state of the low-profile air-conditioning register when the operation knob assembly is operated rightward from the neutral state in FIG. 6.

In contrast, the application of, for example, a rightward force to the operation knob assembly 60 in the neutral state shown in FIGS. 6 and 8 in the lateral direction, which is the extension direction of the long side portions 22 of the outlet port 20, causes the downstream fin 36 to be swung counterclockwise as viewed in FIG. 6 about the upper and lower downstream fin pivots 39 together with the left and right downstream intermediate gears 87 and the upstream intermediate gear 81. The swinging motion of the downstream fin 36 is transmitted to the other downstream fins 37 by the link mechanism 43. As shown in FIG. 10, each downstream fin 37 is swung in the same direction as the downstream fin 36 about the upper and lower downstream fin pivots 39. Thus, the air-conditioning air A1 that has passed through the barrel fin 50 flows along the downstream fins 36, 37, so as to be blown out from the outlet port 20 obliquely rightward, which is the direction of the same trend as the operated direction of the operation knob assembly 60.

At this time, among the teeth 83 of the upstream gear section 62 of the upstream intermediate gear 81, the ones meshing with the teeth 78 of the driven gear 77 slide on the teeth 78 of the driven gear 77 in the direction along an arc centered on the downstream fin pivots 39. This changes the engagement position in the lateral direction between the teeth 83 of the upstream intermediate gear 81 and the teeth 78 of the driven gear 77. Thus, the swinging action of the downstream fin 36, which accompanies the operation of the operation knob assembly 60, is not transmitted to the upstream fin 51 or the barrel fin 50. Regardless of the operation of the operation knob assembly 60 in the lateral direction, the inclination of the barrel fin 50 is not changed.

In addition to the ones listed above, the present embodiment has the following advantages.

As shown in FIGS. 3 and 8, two sets of the combination of the intermediate shaft 46 and the downstream intermediate gear 87 supported by the intermediate shaft 46 are employed, and moreover, the two sets are located on both left and right sides of the downstream fin main body 38 in the downstream fin 36. Therefore, as compared with a case in which only one set of the combination of the downstream intermediate gear 87 and intermediate shaft 46 is provided, the power transmission from the drive gears 75 to the upstream intermediate gear 81 is performed stably.

The upstream intermediate gear 81 and the downstream intermediate gears 87 are mounted to the downstream fin main body 38 of the downstream fin 36, which is an existing component of the low-profile air-conditioning register. Thus, it is not necessary to newly add components to create a section to which the upstream intermediate gear 81 and the downstream intermediate gears 87 are mounted. This limits the increase in the number of components.

It should be apparent to those skilled in the art that the present invention may be embodied in many other specific forms without departing from the scope of the invention. Particularly, it should be understood that the present invention may be embodied in the following forms.

<Regarding Retainer 10>

In the outlet port 20, the short side portions 21 and the long side portions 22 do not necessarily have to be orthogonal to each other. That is, the short side portions 21 and the long side portions 22 may intersect somewhat obliquely on condition that the outlet port 20 has a rectangular shape.

The inclined surfaces 26, 28 in FIG. 9A may be composed of curved surfaces recessed toward the downstream side or curved surfaces bulging toward the upstream side instead of the flat surfaces described above on the condition that the inclined surfaces 26, 28 are connected to the long side portions 22 with the distance in between narrowing toward the downstream side.

<Regarding Barrel Fin 50>

The three upstream fins 51, 52 in the barrel fin 50 of FIG. 3 may be formed independently of each other. In this case, the upstream fin pivots 55 are provided at both ends in the lateral direction of each of the upstream fins 51, 52. Each of the upstream fins 51, 52 is swingably supported by the side wall portions 23 of the retainer 10 with the left and right upstream fin pivots 55.

Similarly to the downstream coupling pins 41 of the downstream fins 36, 37, the upstream fins 51, 52 are provided with upstream coupling pins at positions displaced in the flow direction of the air-conditioning air A1 from the upstream fin pivots 55. The upstream coupling pins of the respective upstream fins 51, 52 are coupled together by a coupling rod extending in the vertical direction. The upstream coupling pins of the respective upstream fins 51, 52 and the coupling rod constitute a link mechanism that mechanically couples the upstream fins 51, 52 together and allows the upstream fins 52 to swing in synchronism with the upstream fin 51 such that the upstream fins 52 have the inclination of the same trend as the upstream fin 51, which has the driven gear 77.

In the case where sufficient stiffness of the upstream fin 51, 52 is ensured, the number of the coupling plate portions 54 may be reduced. Alternatively, the coupling plate portions 54 may be omitted. Conversely, the number of the coupling plate portions 54 may be increased to further increase the stiffness.

The number of the upstream fins 52 in the barrel fin 50 may be changed.

<Regarding Operation Knob Assembly 60>

The operation knob assembly 60 may be arranged outside the outlet port 20. In this case, at least some the components of the transmission mechanism DM are arranged outside the air passage 16.

The knob 62 may have a shape different from the truncated cone-like shape in the above-illustrated embodiment.

<Regarding Transmission Mechanism DM>

The number of combinations of the downstream intermediate gears 87 and the intermediate shafts 46 used in the transmission mechanism DM may be changed from two to one.

One intermediate shaft 46 may be pivotally inserted into the downstream fin main body 38 of the downstream fin 36, and a pair of downstream intermediate gears 87 arranged on the left and right sides of the downstream fin main body 38 may be integrally pivotally attached to the left and right ends of the intermediate shaft 46 exposed from the downstream fin main body 38.

<Regarding Applicability>

The low-profile air-conditioning register may be provided at a location in the passenger compartment other than the instrument panel.

As long as the above-described low-profile air-conditioning register adjusts the direction of the air-conditioning air that is delivered from an air conditioner and blown out from the outlet port into the room, the low-profile air-conditioning register may be employed in a wide range of apparatuses other than vehicles.

<Other Modifications>

The outlet port 20 of the above-described low-profile air-conditioning register may be arranged as a rectangle elongated in the vertical direction. In this case, fins that extend in the lateral direction and the flow direction of the air-conditioning air A1 are used as the downstream fins 36, 37, and these are arranged in the vertical direction. Fins that extend in the vertical direction and the flow direction are used as the upstream fins 51, 52, and these are arranged to be spaced apart from each other in the lateral direction.

The present examples and embodiments are to be considered as illustrative and not restrictive, and the invention is not to be limited to the details given herein, but may be modified within the scope and equivalence of the appended claims.

The invention claimed is:

1. A low-profile air-conditioning register comprising:
a retainer having an air passage, wherein
the air passage has an outlet port at a downstream end in a flow direction of air-conditioning air,
the outlet port has a rectangular shape composed of a pair of opposed short side portions and a pair of opposed long side portions, which intersect with the short side portions,
the retainer includes a pair of inclined surfaces at a downstream end in the flow direction of the retainer, and
the inclined surfaces face each other and are connected to the long side portions such that a distance between the inclined surfaces decreases toward a downstream side;
a plate-shaped fin, which is arranged upstream in the flow direction of the inclined surfaces and extends along the long side portions, wherein
the fin is swingably supported by the retainer with a fin pivot, which extends in an extension direction of the long side portions, and
the low-profile air-conditioning register is configured such that after flowing along the fin and striking an inner wall surface of the retainer so that the flow direction is changed, the air-conditioning air flows along one of the inclined surfaces to be blown out obliquely from the outlet port;
an operation knob assembly provided at a downstream section in the flow direction of the retainer to be operable in an extension direction of the short side portions; and
a transmission mechanism provided between the operation knob assembly and the fin, the transmission mechanism being configured to transmit a motion of the operation knob assembly to the fin such that the fin is swung in a direction of an opposite trend to an operated direction of the operation knob assembly, wherein
the operation knob assembly is arranged at the outlet port,
the transmission mechanism includes
a drive gear, which is provided in an upstream section in the flow direction of the operation knob assembly, the drive gear having a plurality of teeth arranged in the extension direction of the short side portions,
a driven gear, which is provided in a downstream section in the flow direction of the fin, the driven gear having a plurality of teeth arranged along an arc centered on the fin pivot, and
a plurality of intermediate gears, which is arranged between the drive gear and the driven gear,
the fin is an upstream fin,
the fin pivot is an upstream fin pivot,
the low-profile air-conditioning register further comprises a downstream fin, which is arranged downstream in the flow direction of the upstream fin and extends along the short side portions,
the downstream fin is swingably supported by the retainer with a downstream fin pivot, which extends in the extension direction of the short side portions,
the operation knob assembly is attached to the downstream fin so as to be operable in the extension direction of the short side portions,
the intermediate gears are attached to the downstream fin,
the downstream fin has, at a downstream end in the flow direction, a downstream rail portion extending in the extension direction of the short side portions,
the operation knob assembly has a groove extending in the extension direction of the short side portions, and
the operation knob assembly is attached to the downstream fin by being engaged with the downstream rail portion at the groove.

2. The low-profile air-conditioning register according to claim 1, wherein
the downstream fin has, at an upstream end in the flow direction, an upstream rail portion extending in the extension direction of the short side portions, and
the intermediate gears include
an upstream intermediate gear, which is attached to the upstream rail portion while being meshed with the driven gear, so as to be slidable in the extension direction of the short side portions, and
a downstream intermediate gear, which is pivotally supported by the downstream fin with an intermediate shaft while being meshed with the drive gear and the upstream intermediate gear.

3. The low-profile air-conditioning register according to claim 2, wherein
the intermediate shaft is located between the upstream rail portion and the downstream rail portion and protrudes to both sides in the extension direction of the long side portions from the downstream fin,
the downstream intermediate gear is one of a pair of downstream intermediate gears, and
the downstream intermediate gears are arranged on both sides of the downstream fin in the extension direction of the long side portions, so as to be pivotally supported by the downstream fin with the intermediate shaft.

4. The low-profile air-conditioning register according to claim 2, wherein
the teeth of the driven gear extend in the extension direction of the long side portions, and
the upstream intermediate gear has a plurality of teeth arranged in the extension direction of the short side portions, the teeth extending in a direction along an arc centered on the downstream fin pivot.

5. The low-profile air-conditioning register according to claim 1, wherein
the upstream fin is one of a plurality of upstream fins that constitutes part of a barrel fin,
the upstream fins are spaced apart from each other in the extension direction of the short side portions,
one of the upstream fins has the driven gear,
each upstream fin has first and second ends in the extension direction of the long side portions, the first ends and the second ends of the upstream fins are respectively coupled together by a pair of side plate portions, which extends in the extension direction of the short side portions, the upstream fin pivot is one of two upstream fin pivots provided to each side plate portion, and the barrel fin is swingably supported by the retainer with the two upstream fin pivots.

* * * * *